(12) United States Patent
Huang et al.

(10) Patent No.: US 9,346,250 B2
(45) Date of Patent: May 24, 2016

(54) POLARIZER, MANUFACTURING METHOD THEREOF, AND 3D DISPLAY DEVICE

(71) Applicant: BOE TECHNOLOGY GROUP CO., LTD., Beijing (CN)

(72) Inventors: Hua Huang, Beijing (CN); Shi Shu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 60 days.

(21) Appl. No.: 14/099,017

(22) Filed: Dec. 6, 2013

(65) Prior Publication Data

US 2014/0168773 A1    Jun. 19, 2014

(30) Foreign Application Priority Data

Dec. 13, 2012   (CN) .......................... 2012 1 0539744

(51) Int. Cl.
*G02B 5/30* (2006.01)
*B32B 37/02* (2006.01)
(Continued)

(52) U.S. Cl.
CPC ............... *B32B 37/02* (2013.01); *G02B 5/305* (2013.01); *B32B 38/0008* (2013.01);
(Continued)

(58) Field of Classification Search
CPC ................... G02B 5/30–5/305; G02B 5/3083; G02B 5/32; G02B 1/08; G02B 27/22; G02B 27/26; G02B 27/28; B32B 38/0008; B32B 2038/168; B32B 2309/02; B32B 2310/0831; B32B 2457/20
USPC ........................ 359/458, 465, 485.01–485.05, 359/487.01–487.06, 489.01–489.07, 359/492.01; 156/275.5, 60; 216/24; 353/20; 348/752
See application file for complete search history.

(56) References Cited

U.S. PATENT DOCUMENTS 5,540,988 A * 7/1996 Tachibana ........ G11B 11/10584
156/272.4
6,084,647 A * 7/2000 Hatano et al. ................... 349/15
(Continued)

FOREIGN PATENT DOCUMENTS

CN     1559013     12/2004
CN     1584704     2/2005
(Continued)

OTHER PUBLICATIONS

CN 2012105397441 Office Action, English Translation.
(Continued)

*Primary Examiner* — Stephone B Allen
*Assistant Examiner* — Adam W Booher
(74) *Attorney, Agent, or Firm* — Brooks Kushman P.C.

(57) ABSTRACT

The present invention relates to the field of 3D display technology and provides a polarizer, manufacturing method thereof, and a 3D display device. According to the present invention, a transition layer is provided between an alignment layer and a supporting layer, and there is excellent wettability between the transition layer and the supporting layer as well as the alignment layer. The polarizer comprises a polarizing layer for producing linearly polarized light, a supporting layer located at one side of the polarizing layer, a transition layer arranged on one side of the supporting layer away from the polarizing layer, an alignment layer arranged on one side of the transition layer away from the polarizing layer, and an optical rotation layer arranged on one side of the alignment layer away from the polarizing layer.

18 Claims, 3 Drawing Sheets

(51) Int. Cl.
*B32B 38/00* (2006.01)
*B32B 38/16* (2006.01)

(52) U.S. Cl.
CPC ...... *B32B 2038/168* (2013.01); *B32B 2309/02* (2013.01); *B32B 2310/0831* (2013.01); *B32B 2457/20* (2013.01); *Y10T 156/10* (2015.01)

(56) References Cited

U.S. PATENT DOCUMENTS

| | | | |
|---|---|---|---|
| 7,423,715 | B2 | 9/2008 | Hisatake |
| 7,442,420 | B2* | 10/2008 | Tanaka et al. ............ 428/1.2 |
| 7,671,945 | B2* | 3/2010 | Hale ............ G02F 1/13363 349/117 |
| 2002/0061361 | A1* | 5/2002 | Nakahara ............ 427/58 |
| 2003/0090012 | A1 | 5/2003 | Allen et al. |
| 2010/0165258 | A1* | 7/2010 | Hamada et al. ............ 349/76 |

FOREIGN PATENT DOCUMENTS

| | | |
|---|---|---|
| CN | 101241260 | 8/2008 |
| CN | 102540314 | 7/2012 |

OTHER PUBLICATIONS

Chinese Office Action for CN 201210539744.1. English Translation attached to original, Completed by the Chinese Patent Office, Dated Jun. 5, 2014, 14 Pages.

Second Chinese Office Action CN 2012105397441 dated Jan. 19, 2015; 5 pages, [English Translation provided].

\* cited by examiner

POLARIZER, MANUFACTURING METHOD THEREOF, AND 3D DISPLAY DEVICE

CROSS-REFERENCE TO RELATED APPLICATIONS

This application claims priority to Chinese patent application No. 201210539744.1, filed on Dec. 13, 2012, and entitled "Polarizer, Manufacturing Method Thereof, and 3D Display Device", which is hereby incorporated by reference in its entirety.

TECHNICAL FIELD

The present invention relates to a field of 3D display technology, in particular to a polarizer, manufacturing method thereof, and a 3D display device.

BACKGROUND 3D display refers to converting light from a display device into levorotatory and dextrorotary light with different polarization states through a pattern retarder film (PR), so that an observer can use matching glasses to see different graphics through his two eyes respectively.

As shown in FIG. 1, an alignment layer 3 and an optical rotation layer 4 are provided onto a supporting layer 2 at one side of a polarizing layer 1, so as to reduce the thickness and weight of the display.

However, during the manufacture, there exists a poor wettability between the materials of the alignment layer 3 and the supporting layer 2. As a result, the selection of the materials of the alignment layer 3 will be limited and it will take a lot of time to test the materials thereof.

SUMMARY

An object of the present invention is to provide a polarizer, manufacturing method thereof and a 3D display device, so as to overcome the defect that the selection of materials of an alignment layer is limited due to a poor wettability between the materials of the alignment layer and a supporting layer.

One aspect according to the present invention provides a polarizer, which comprises a polarizing layer for producing linearly polarized light and a supporting layer located at one side of the polarizing layer, wherein the polarizer further comprises: a transition layer arranged on one side of the supporting layer away from the polarizing layer; an alignment layer arranged on one side of the transition layer away from the polarizing layer; and an optical rotation layer arranged on one side of the alignment layer away from the polarizing layer.

In a preferable aspect according to the above aspect, the alignment layer is made of a first lightcurable material.

In a preferable aspect according to the above aspects, the transition layer is made of a second lightcurable material different from the first lightcurable material.

In a preferable aspect according to the above aspects, process temperatures desired for forming the alignment layer with the first lightcurable material and forming the transition layer with the second lightcurable material are less than or equal to a maximum temperature which can be endured by the polarizing layer.

One aspect according to the present invention provides a method for manufacturing the polarizer according to the above aspects, wherein the transition layer is formed before the alignment layer is formed and after the supporting layer has been formed.

In a preferable aspect according to the above aspect, the method further comprises the steps of: providing a substrate; attaching a polarizing layer onto the substrate; forming the supporting layer on the polarizing layer; forming the transition layer on the supporting layer; forming the alignment layer on the transition layer; and forming an optical rotation layer on the alignment layer.

In a preferable aspect according to the above aspects, wherein the step of forming the transition layer on the supporting layer comprises: forming a lightcurable material layer for preparing the transition layer on the supporting layer; removing the solvent in the lightcurable material layer; and fully curing the lightcurable material layer with UV light so as to form the transition layer.

In a preferable aspect according to the above aspects, wherein the step of forming the transition layer on the supporting layer further comprises: an ashing treatment is proceeded on the surface of the fully-cured lightcurable material layer.

In a preferable aspect according to the above aspects, the ashing treatment is proceeded with $SF_6$ and $O_2$ for about 5 to 7 seconds in a dry-etching device.

In a preferable aspect according to the above aspects, the method further comprises: separating the polarizer from the substrate.

One aspect according to the present invention provides a 3D display device, which comprises a display panel and the polarizer according to the above aspects located at a display side of the display panel, wherein the polarizing layer is closer to the display panel than the optical rotation layer.

The present invention has the following technical effects. The transition layer made of an existing material is provided between the alignment layer and the supporting layer using existing devices and processes, and there is an excellent wettability between the transition layer and the supporting layer as well as the alignment layer. As a result, it is able to overcome the defect of a poor wettability between the alignment layer and the supporting layer.

The present invention will be more clearly understood from the description of preferred embodiments as set forth below, with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

To make the technical problems, the technical solutions and the advantages of the present invention more apparent, the present invention is described hereinafter in conjunction with the drawings (i.e., FIGS. 2 to 6) and the embodiments.

One embodiment according to the present invention provides a polarizer, and a transition layer is provided between a supporting layer and an alignment layer of the polarizer.

Figure 1:
FIG. 1 is a side schematic view showing the structure of an existing polarizer.
Figure 2:
FIG. 2 is a side section schematic view showing the structure of a polarizer according to one embodiment of the present invention.

Another embodiment according to the present invention provides a polarizer which, as shown in FIG. 2, comprises a polarizing layer 1 for producing linearly polarized light, a supporting layer 2 located at one side of the polarizing layer 1, a transition layer 5 formed on one side of the supporting layer 2 away from the polarizing layer 1, an alignment layer 3 formed on one side of the transition layer 5 away from the polarizing layer 1, and an optical rotation layer 4 formed on one side of the alignment layer 3 away from the polarizing layer 1.

Preferably, the material of the supporting layer may be the common materials used for the supporting layer 2 in the present technical field, preferably triacetyl cellulose (TAC), and so on. The material of the polarizing layer 1 may be the common materials used for the polarizing layer in the present technical field. The material of the alignment layer 3 may be the common materials used for the alignment layer in the present technical field.

The transition layer 5 is provided between the alignment layer 3 and the supporting layer 2.

Further another embodiment according to the present invention, the transition layer 5 made of an existing material may be provided between the alignment layer 3 and the supporting layer 2 using existing devices and processes. Preferably, the material of the transition layer 5 may be existing lightcurable materials, such as a lightcurable over coat (OC) materials. The preferable lightcurable OC materials may be unsaturated polyesters or acrylic resins, and so on. It is desired that there is a better wettability both between the transition layer 5 and the supporting layer 2, and between the transition layer 5 and the alignment layer 3, than the wettability between the alignment layer 3 and the supporting layer 2. As a result, it is able to overcome the defect of a poor wettability between the alignment layer 3 and the supporting layer 2.

The optical rotation layer 4 is further provided on the alignment layer 3 and may be made of a polymerizable liquid crystal monomer (RM) material. To be specific, the polymerizable liquid crystal monomer material may be diacrylate resins having a liquid crystal feature or unsaturated polyester resins having a liquid crystal feature. The polymerizable liquid crystal monomer material itself does not have an alignment property. The alignment layer must be performed under the induction of the alignment layer 3 so as to achieve an ordered alignment, thereby to perform levorotation and dextrorotation in controllable regions on the light passing therethrough.

In a preferred embodiment, the alignment layer 3 may preferably be made of a lightcurable material, such as light degradable polyimides, light polymerizable polyimides and/or light isomerizable polyimides.

In a particularly preferred embodiment, process temperatures desired for forming the transition layer 5 with lightcurable material and forming the alignment layer 3 with lightcurable material are less than or equal to a maximum temperature which can be endured by the polarizing layer (i.e., an ultimate temperature that can be endured by the polarizing layer 1).

Usually, the maximum temperature that can be endured by the polarizing layer 1 is 80° C. As a result, the temperature for preparing the transition layer 5 on supporting layer 2 with the polarizing layer 1 using the lightcurable material shall be less than or equal to 80° C., so as to avoid damaging the polarizing layer 1. Similarly, the temperature for preparing the alignment layer 3 shall also be less than or equal to 80° C.

Preferably, after the lightcurable transition layer 5 is formed on the supporting layer 2, an ashing treatment is proceeded to amend the surface of the transition layer 5, so as to improve the wettability between the alignment layer 3 which will be provided in following step and the transition layer 5. During the preparation, the transition layer 5 may be made of an existing mass-produced material, such as a lightcurable OC material, and it is unnecessary to select and develop any new materials. As a result, the difficulty of development has been reduced.

Another embodiment according to the present invention further provides a method for manufacturing a polarizer comprising a polarizing layer for producing linearly polarized light and a supporting layer located at one side of the polarizing layer; a transition layer arranged on one side of the supporting layer away from the polarizing layer; an alignment layer arranged on one side of the transition layer away from the polarizing layer; and an optical rotation layer arranged on one side of the alignment layer away from the polarizing layer. The transition layer is prepared before the alignment layer is formed and after the supporting layer has been formed.

Figure 6:
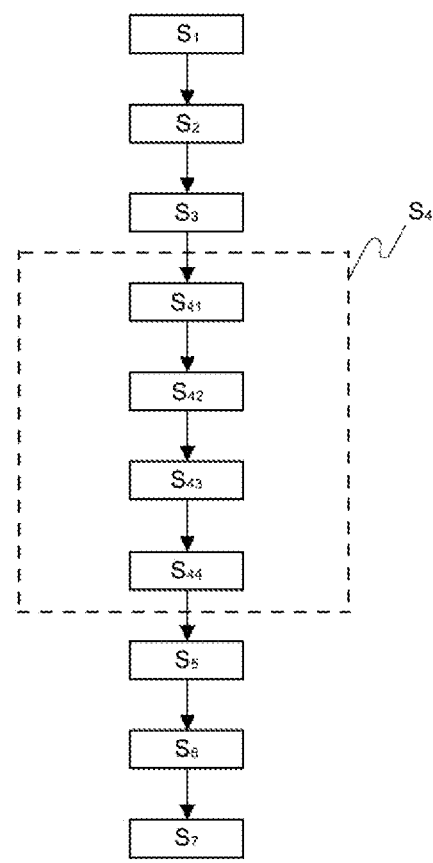
FIG. 6 is a block schematic view showing the steps of the method for manufacturing the polarizer according to one embodiment of the present invention.

To be specific, the method for manufacturing the polarizer comprises the following steps, as shown in FIG. 6.

Step S1: proving a substrate 6.

The substrate 6 may be a glass substrate, a metal substrate, a quartz substrate or an organic material substrate. The substrate may be a blank substrate without any patterns. Also, it may be a color film substrate with, at one side, the patterns such as a color resin layer or a black matrix, and a subsequent film may be provided on the side without any patterns.

Step S2: attaching a polarizing layer 1 onto the substrate 6.

Figure 3:
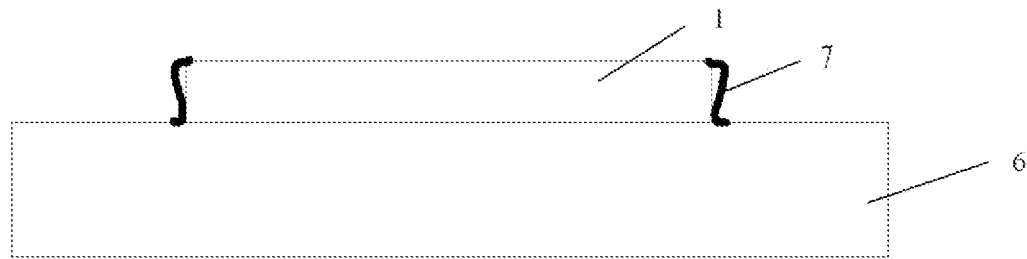
FIG. 3 is a side schematic view showing the polarizer produced on a substrate according to one embodiment of the present invention.
Figure 4:
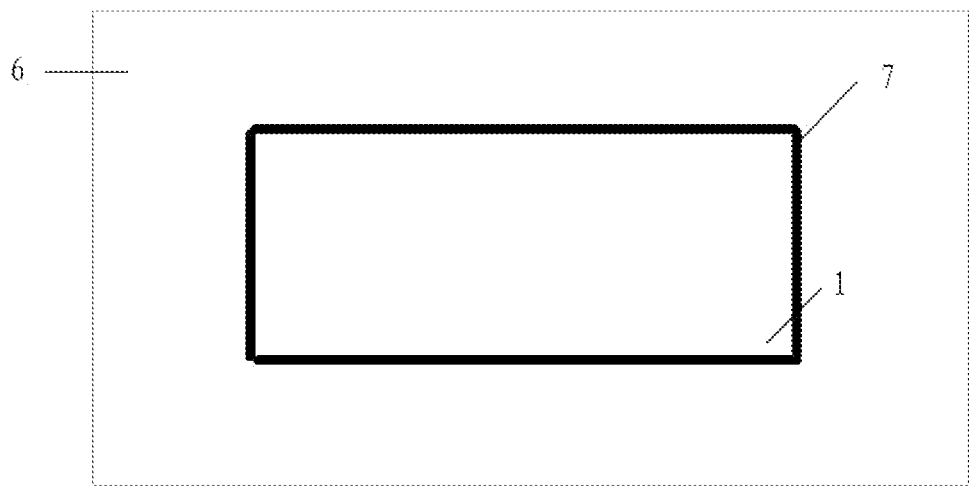
FIG. 4 is a top schematic view showing the polarizer produced on the substrate according to one embodiment of the present invention.
Figure 5:
FIG. 5 is a side section schematic view showing the structure of the polarizer formed on the substrate according to one embodiment of the present invention.

An adhesive may be coated onto one side of the polarizing layer 1, and then the polarizing layer 1 is directly attached onto the side of the substrate 6 without any patterns. Also, as shown in FIGS. 3 and 4, the polarizing layer 1 may be sealed with an adhesive tape 7 and then attached to the substrate 6. The method of attachment may be any present methods used in the present technical field without limiting to the above methods.

Step S3: providing a supporting layer 2 on the polarizing layer 1.

To be specific, the supporting layer 2 is formed at one side of the polarizing layer 1 away from the substrate 6 by a method commonly used for the polarizer, such as attachment, adhesion or lamination, which is not defined in the present invention.

Step S4: forming a transition layer 5 on the supporting layer 2.

To be specific, step S4 comprises the following steps.

Step S41: forming a lightcurable material layer for preparing the transition layer 5 on the supporting layer 2.

The lightcurable material layer may be formed by spin, slit or blade coating, and the thickness of the lightcurable material may be controlled by adjusting the process based on different coating ways. If a spin coating process is used, the thickness of the lightcurable material may be controlled by adjusting rotation speed and rotation time. If a blade coating process is used, the thickness of the lightcurable material may be controlled by adjusting the pressure for the blade coating.

Step 42: removing the solvent from the lightcurable material layer.

Usually, an ultimate temperature that can be endured by the polarizing layer 1 is 80° C., so the solvent in the lightcurable material layer may be removed at a process temperature lower than 80° C. For example, the solvent in the lightcurable material layer may be removed by a low pressure vacuum process and heating.

Step S43: fully curing the lightcurable material layer with UV light to form the transition layer 5.

The lightcurable material layer may be fully cured with UV light, and the cavity of the device used for it is controlled at a temperature blow 80° C., so as to avoid damaging the polarizing layer.

The transition layer 5 may be formed on the supporting layer 2 through steps S41-S43. In addition to steps S41-S43, step 4 may further comprise:

Step S44: ashing the surface of the fully-cured transition layer.

After the transition layer 3 is fully cured, the surface of the transition layer 3 may be proceeded an ashing treatment with $SF_{6\ and\ O2}$ for about 5 to 7 seconds using a dry-etching device such as a PECVD (Plasma Enhanced Chemical Vapor Deposition) device, so as to enhance the surface adhesion with an alignment layer 3 which will be formed in following step S5.

Step S5: forming an alignment layer 3 on the transition layer 5.

An alignment layer material is coated onto the transition layer 5 by the way of ink jetting or an APR plate (a light sensitive resin plate) transfer printing to form an alignment layer liquid membrane, and then the alignment layer liquid membrane is cured to form the alignment layer 3.

Step S6: forming an optical rotation layer 4 on the alignment layer 3.

A polymerizable liquid crystal monomer (RM) layer is provided on the alignment layer 3 so as to form the optical rotation layer 4. Under the induction of the alignment layer 3, the optical rotation layer 4 can perform levorotation and dextrorotation with controllable regions on the light passing therethrough.

Further, when the polarizer 10 is directly formed on a blank substrate, the method further comprises:

Step S7: separating the polarizer 10 from the substrate 6. After the polarizer 10 is completed, the adhesive tape 7 is removed so as to separate the polarizer 10 from the substrate 6, thereby to obtain a finished polarizer. The polarizer may be cut according to the dimensions of the panels with different types, and then the subsequent processes, such as attachment, may be performed. It is able to avoid an adverse effect caused to a non-display (e.g., fanout) region around the display region when the polarizer is directly formed on the side of the color film substrate without any patterns.

An advantage of the method of the present invention is that the spin coating or slit coating processes, the PECVD device, the ink jetting or APR plate transfer printing are all existing technologies, and the lightcurable material is an existing material. In other words, the transition layer is formed between the alignment layer and the supporting layer by the existing device, processes and materials. Because there is an excellent wettability between the transition layer and the supporting layer as well as the alignment layer, it is able to overcome the defect of a poor wettability between the alignment layer and the supporting layer.

Another embodiment according to the present invention further provides a 3D display device comprising a display panel and the above-mentioned polarizer located at a display side of the display panel, wherein a polarizing layer is closer to the display panel than an optical rotation layer.

The above are merely the preferred embodiments of the present invention. It should be noted that, a person skilled in the art may make improvements and modifications without departing from the principle of the present invention, and these improvements and modifications shall also be considered as the scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A polarizer, comprising a polarizing layer for producing linearly polarized light and a supporting layer located at one side of the polarizing layer, wherein the polarizer further comprises:
a transition layer arranged on one side of the supporting layer away from the polarizing layer;
an alignment layer arranged on one side of the transition layer away from the polarizing layer; and
an optical rotation layer arranged on one side of the alignment layer away from the polarizing layer;
wherein the alignment layer is made of a first light curable material and the transition layer is made of a second light curable material different from the first light curable material.

2. The polarizer according to claim 1, wherein process temperatures for forming the alignment layer with the first light curable material and forming the transition layer with the second light curable material are less than or equal to a maximum temperature which can be endured by the polarizing layer.

3. The polarizer according to claim 2, wherein the second light curable material is one of unsaturated polyester and acrylic resin, and the first light curable material is one of light degradable polyimide, light polymerizable polyimide and light isomerizable polyimide.

4. The polarizer according to claim 3, wherein the supporting layer is made of triacetyl cellulose.

5. The polarizer according to claim 1, wherein there is a better wettability both between the transition layer and the supporting layer, and between the transition layer and the alignment layer, than the wettability between the alignment layer and the supporting layer.

6. A method for manufacturing the polarizer according to claim 1, wherein the transition layer is formed before the alignment layer is formed and after the supporting layer has been formed.

7. The method according to claim 6, further comprising the steps of:
providing a substrate;
attaching a polarizing layer onto the substrate;
forming the supporting layer on the polarizing layer;
forming the transition layer on the supporting layer;
forming the alignment layer on the transition layer; and
forming an optical rotation layer on the alignment layer.

8. The method according to claim 7, wherein the step of forming the transition layer on the supporting layer comprises:
forming a light curable material layer for preparing the transition layer on the supporting layer;
removing the solvent in the light curable material layer; and
fully curing the light curable material layer with UV light so as to form the transition layer.

9. The method according to claim 8, wherein the step of forming the transition layer on the supporting layer further comprises:
an ashing treatment is proceeded on the surface of the fully-cured light curable material layer.

10. The method according to claim 9, wherein, the ashing treatment is proceeded with $SF_6$ and $O_2$ for about 5 to 7 seconds in a dry-etching device.

11. The method according to claim 7, wherein, process temperatures for forming the alignment layer with the first light curable material and forming the transition layer with the second light curable material are less than or equal to a maximum temperature which can be endured by the polarizing layer;
wherein the second light curable material is one of unsaturated polyester and acrylic resin; the first light curable material is one of light degradable polyimide, light polymerizable polyimide and light isomerizable polyimide.

12. The method according to claim 7, wherein there is a better wettability both between the transition layer and the supporting layer, and between the transition layer and the alignment layer, than the wettability between the alignment layer and the supporting layer.

13. The method according to claim 7, further comprising:
separating the polarizer from the substrate.

14. A three-dimensional (3D) display device, comprising a display panel and the polarizer according to claim 1 located at a display side of the display panel, wherein the polarizing layer is closer to the display panel than the optical rotation layer.

15. The 3D display device according to claim 14, wherein the alignment layer is made of a first light curable material.

16. The 3D display device according to claim 14, wherein there is a better wettability both between the transition layer and the supporting layer, and between the transition layer and the alignment layer, than the wettability between the alignment layer and the supporting layer.

17. The 3D display device according to claim 14, wherein the second light curable material is one of unsaturated polyester and acrylic resin;
the first light curable material is one of light degradable polyimide, light polymerizable polyimide and light isomerizable polyimide.

18. The 3D display device according to claim 17, wherein the supporting layer is made of triacetyl cellulose.

* * * * *